(12) United States Patent
Otsuka et al.

(10) Patent No.: US 7,592,584 B2
(45) Date of Patent: Sep. 22, 2009

(54) CROSSTALK PREVENTING OPTICAL ENCODER

(75) Inventors: Takanori Otsuka, Utsunomiya (JP); Kazuhiko Kodama, Utsunomiya (JP); Toru Yaku, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 11/976,836

(22) Filed: Oct. 29, 2007

(65) Prior Publication Data

US 2008/0111063 A1 May 15, 2008

(30) Foreign Application Priority Data

Nov. 15, 2006 (JP) .............................. 2006-309183

(51) Int. Cl.
*G01D 5/34* (2006.01)
(52) U.S. Cl. .............................. 250/231.13; 250/208.2; 341/11; 356/617
(58) Field of Classification Search ................................. 250/231.13–231.18, 237 G, 237 R, 208.2; 356/616–618; 341/11, 13; 33/1 PT, 1 N, 33/11
See application file for complete search history.

(56) References Cited

U.S. PATENT DOCUMENTS 6,157,025 A * 12/2000 Katagiri et al. ............. 250/226
6,713,756 B2 * 3/2004 Yamamoto et al. ...... 250/231.13
6,742,275 B2 * 6/2004 Mayer et al. .................. 33/707
2007/0187582 A1 * 8/2007 Chin et al. ............. 250/231.13

FOREIGN PATENT DOCUMENTS

| JP | A 01-272917 | 10/1989 |
|----|-------------|---------|
| JP | A 05-099691 | 4/1993 |
| JP | A 08-233610 | 9/1996 |
| JP | A 09-304112 | 11/1997 |
| JP | A 2002-228491 | 8/2002 |
| JP | A 2003-106871 | 4/2003 |

* cited by examiner

*Primary Examiner*—Thanh X Luu
*Assistant Examiner*—Francis M Legasse, Jr.
(74) *Attorney, Agent, or Firm*—Oliff & Berridge, PLC

(57) ABSTRACT

An optical encoder (100) is provided with: a light-emitting element (30) including a main-signal light-emitting element (31) having a red LED (31A) that emits red light and an origin light-emitting element (32) having an infrared LED (32A) that emits infrared light; and a receiver unit (40) including a main-signal photo detector (41) that receives the red light to generate a predetermined signal and an origin photo detector (42) that receives the infrared light to generate a predetermined signal. Accordingly, even when the infrared light enters the main-signal photo detector (41) or the red light enters the origin photo detector (42), no signal is generated by the light, thereby effectively preventing crosstalk. Thus, the measurement accuracy of the optical encoder (100) can be improved.

3 Claims, 12 Drawing Sheets

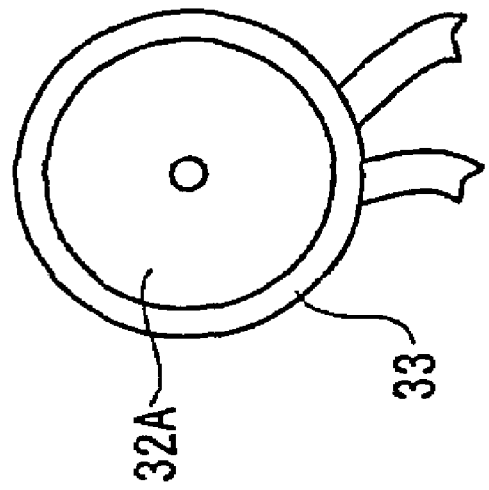
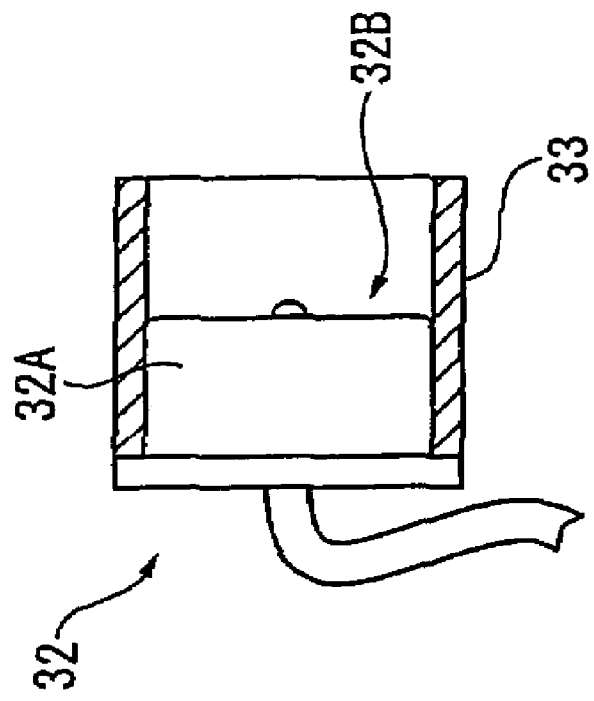

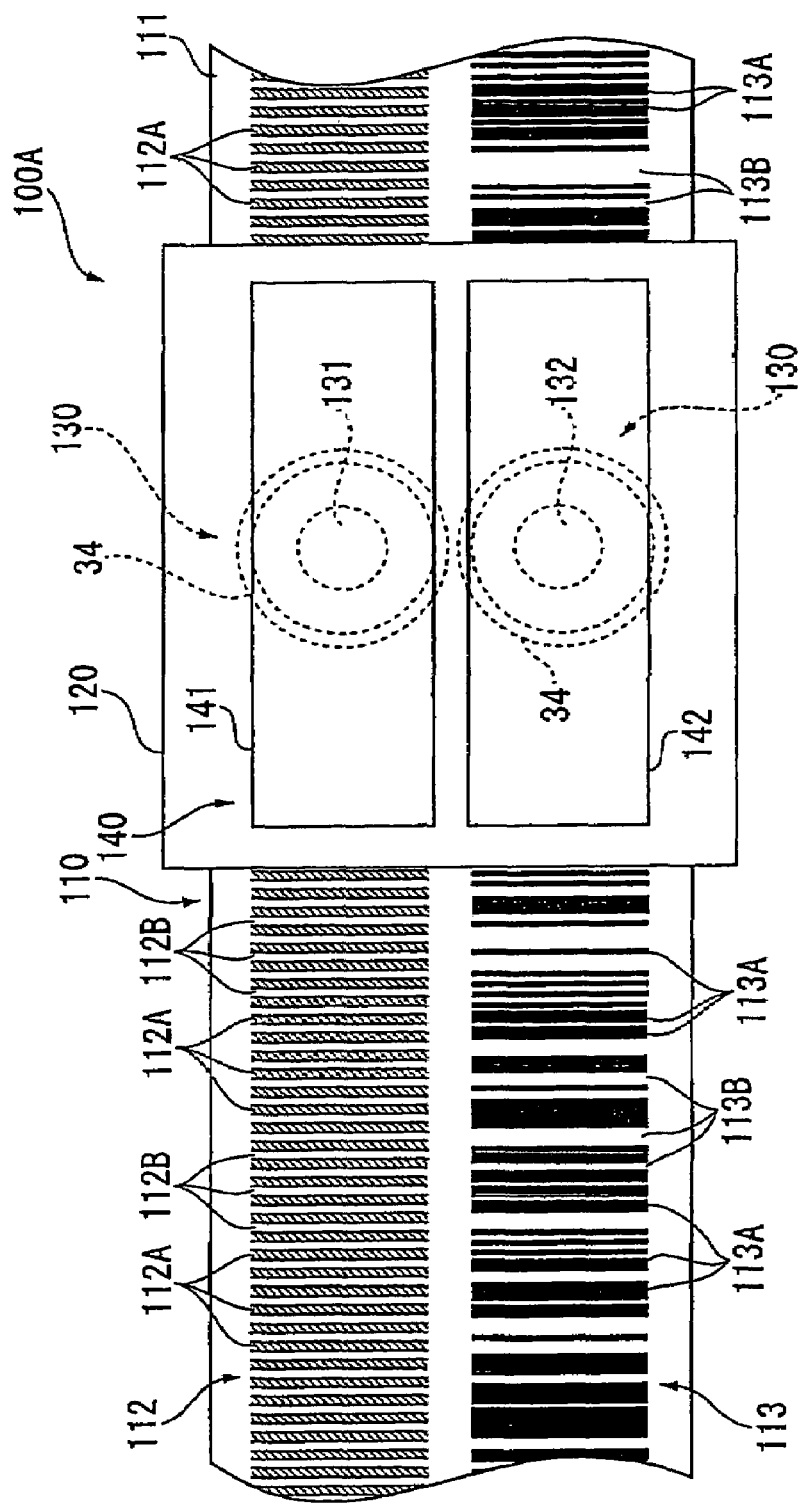

CROSSTALK PREVENTING OPTICAL ENCODER

BACKGROUND OF THE INVENTION

1. Field of the Invention

The present invention relates to an optical encoder that receives light emitted from a light source by a photo detector and detects the light received by the photo detector.

2. Description of Related Art

An optical encoder that receives light emitted from a plurality of light sources by photo detectors provided for each of the light sources has been known (see, for instance, JP-A-5-99691 (Page 3 and FIG. 1)).

The optical encoder described in JP-A-5-99691 includes: a code plate on which slits and light shield sections are alternately arranged at a predetermined pitch; a pair of light sources disposed on a front side of the code plate; and a pair of light receiving arrays disposed on a rear side of the code plate that respectively receive light emitted from the pair of light sources. In the optical encoder, the light sources and the light receiving arrays are respectively opposed sandwiching the code plate disposed therebetween.

In existing encoders such as the above-mentioned optical encoder, when the pair of light sources or the pair of light receiving arrays are disposed too close to each other, the light emitted from one of the light sources enters not only the opposing light receiving array but also the other light receiving array, thus causing crosstalk.

SUMMARY OF THE INVENTION

An object of the present invention is to provide an optical encoder suitably receiving light.

An optical encoder according to an aspect of the present invention includes: a main scale on which at least two displacement-measuring optical gratings are arranged in a predetermined direction; a detector head movable in the predetermined direction relative to the main scale; at least one light-emitting element that emits light respectively to the optical gratings provided on the main scale (10, 110, 210); and at least two photo detectors respectively provided for the optical gratings on the detector head, the photo detectors receiving the light transmitted through or reflected by the optical gratings. The light-emitting element emits light having a different wavelength to the respective optical gratings provided on the main scale. The photo detectors receive the light having the predetermined wavelength that has been transmitted through or reflected by the respective optical gratings.

Herein, the at least two displacement-measuring optical gratings are, for example, a displacement-detecting optical grating and an origin-detecting optical grating.

According to the aspect of the invention, the light-emitting element emits light having a different wavelength to the displacement-measuring optical gratings provided on the main scale. The photo detectors provided in correspondence with the optical gratings receive light having a predetermined wavelength that has been transmitted through or reflected by the optical gratings. Accordingly, since the photo detectors receive no light having a wavelength other than the predetermined wavelength except for the light having the predetermined wavelength, crosstalk in which light having a wavelength outside the predetermined wavelength range enters the photo detector to receive the light having the predetermined wavelength to lower the light detecting accuracy. Hence, even when the photo detectors are disposed close to each other in a downsized optical encoder, the crosstalk can be efficiently avoided while selectively receiving light having a predetermined wavelength. Therefore, the size of the optical encoder can be smaller and the measurement accuracy thereof can be improved.

In the optical encoder, a filter may be provided on an optical path of the light from the light-emitting element to the photo detectors, the filter transmitting light that is emitted from the light-emitting element and is provided with a predetermined wavelength while shielding light having a wavelength other than the predetermined wavelength.

According to the aspect of the invention, since the filter can shield light having a wavelength outside the predetermined wavelength range, the light to be incident on the photo detector can be regulated to the light having a predetermined wavelength corresponding to the photo detector, thereby reliably preventing the crosstalk or the like. Hence, the measurement accuracy of the optical encoder can be further improved.

In the optical encoder, the filter may be provided on at least one of a light-incident side or a light-emitting side of the optical gratings.

According to the aspect of the invention, the filter is provided on the light-incident side or the light-emitting side of the main scale. Accordingly, only the light of the incident light from the main scale which has the predetermined wavelength corresponding to the photo detector can be emitted. Hence, the photo detector can reliably receive the light having the predetermined wavelength only.

In the optical encoder, the filter may be provided on the upstream of the photo detectors of the detector head.

According to the aspect of the invention, the filter is provided on the upstream of the photo detector of the detector head. In other words, when the photo detector is provided on a surface of the detector head opposing the optical grating, the filter is provided on a light receiving surface of the photo detector. When the photo detector is provided on an opposite surface of the detector head not opposing the optical grating, the filter is provided between the photo detector and the detector head or on a surface of the detector head opposing the optical grating. With the arrangement, the light just before entering the photo detector can be made pass through the filter, thereby narrowing the wavelength of the light to be received by the photo detector to the predetermined wavelength. Hence, the crosstalk can be further reliably prevented, thereby further enhancing the accuracy of the optical encoder.

In the optical encoder, the light-emitting element may include a light source for emitting the light and a light-collimating member for collimating the light emitted from the light source.

According to the aspect of the invention, the light-emitting element includes the light-collimating member that collimates light emitted from the light source. Hence, since the light emitted from the light emitting diode is collimated by the light-collimating member, light scattering can be prevented. Therefore, the crosstalk, i.e. dispersion of the emitted light to enter the other photo detector, can be prevented, thereby enhancing the accuracy of the optical encoder.

In the optical encoder, the light-collimating member may be continuously provided around a circumference on a light-emitting side of the light source, the light-collimating member having a substantially cylindrical shape with an axial direction thereof extending in a direction in which the light is emitted.

According to the aspect of the invention, the light-collimating member is provided continuously around the circumference of the light emitting surface of the light source in the substantially cylindrical shape with the axial direction thereof is arranged substantially in the same direction as a direction in which the light is emitted, i.e. in the same direction as that of the optical path. Accordingly, by arranging the light from the light source to pass in the light-collimating member, an inner circumferential surface thereof can avoid light scattering to collimate the emitted light. Therefore, with the simple arrangement, the crosstalk, i.e. dispersion of the emitted light to enter the other photo detector, can be prevented, thereby enhancing the accuracy of the optical encoder.

BRIEF DESCRIPTION OF THE DRAWINGS

FIG. 3A is a cross section of an origin light-emitting element;

FIG. 3B is a front view of the origin light-emitting element when seen from a light-emitting side thereof, FIG. 4 is a front view of an optical encoder of a second embodiment of the invention;

DETAILED DESCRIPTION OF PREFERRED EMBODIMENT(S)

First Embodiment

An optical encoder according to a first embodiment of the present invention will be described below with reference to the drawings.

[Arrangement of Optical Encoder]

Figure 1:
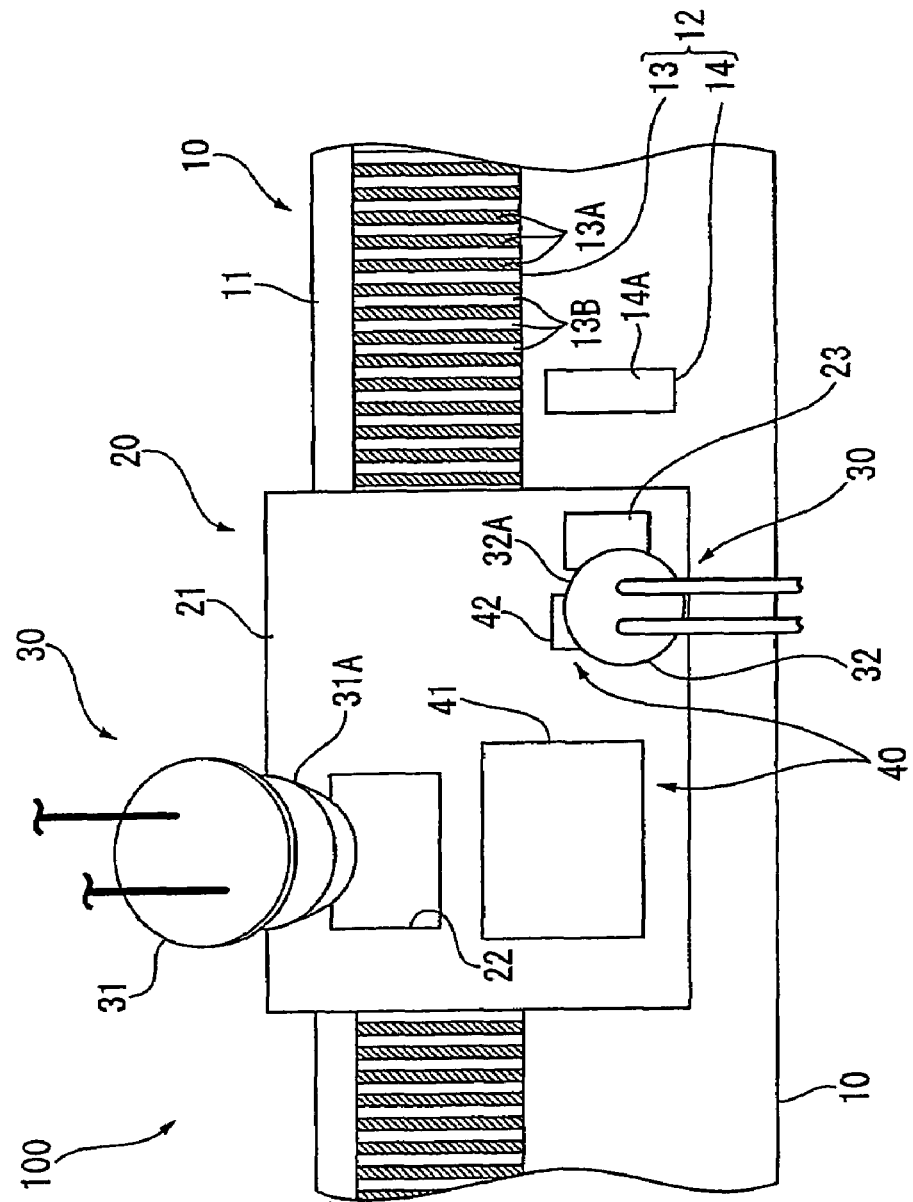
FIG. 1 is a plan view of an optical encoder of a first embodiment of the invention.
Figure 2:
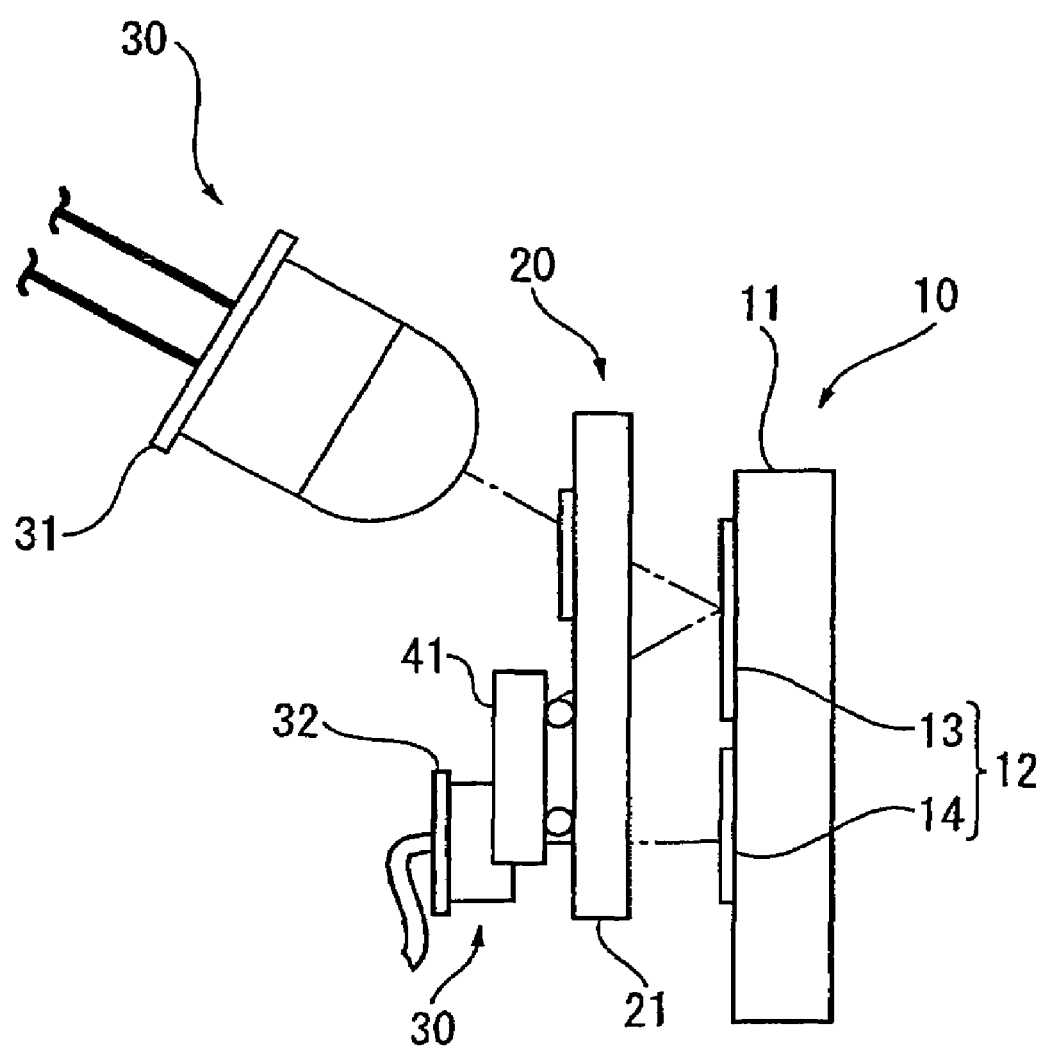
FIG. 2 is a side view of the optical encoder of the first embodiment.

FIG. 1 is a plan view of the optical encoder of the first embodiment FIG. 2 is a side view of the optical encoder. FIG. 3A is a cross section of an origin light-emitting element FIG. 3B is a front view of the origin light-emitting element when seen from a light-emitting side thereof.

In FIGS. 1 to 3B, the reference numeral 100 denotes the optical encoder that includes a reflective main scale 10 having an optical grating 12 arranged along a measurement axis thereof, a light-emitting element 30 being relatively movable along the measurement axis of the main scale 10 and emitting light to the main scale 10, an index scale 20 (a detector head) having a receiver unit 40 that receives light reflected by the main scale 10 to output a displacement signal.

The main scale 10 includes: a strip-shaped main scale substrate 11 made of low linear-expansion-coefficient material (e.g. glass); and the optical grating 12 arranged on a surface of the main scale substrate 11 in a longitudinal direction of the main scale substrate 11 (the measurement axis direction). The optical grating 12 includes: a main-signal optical grating 13 disposed on one side in the measurement axis direction of the main scale 10; and an origin optical grating 14 disposed on the other side in the measurement axis direction of the main scale 10. On the main-signal optical grating 13, reflective sections 13A and irreflexive sections 13B are alternately arranged at a predetermined pitch with longitudinal direction thereof being substantially perpendicular to the measurement axis direction. The origin optical grating 14 is located at a predetermined position on the other side extending in the measurement direction of the main scale 10 and includes an origin reflective section 14A reflecting light emitted from the light-emitting element 30.

Similarly to the main scale 10, the index scale 20 includes a substantially transparent index substrate 21 made of low linear-expansion coefficient material (e.g. glass). As mentioned above, the index scale 20 is relatively movable in the measurement axis direction relative to the main scale 10.

On the index substrate 21, a main-signal light-beam transmitting section 22 that transmits light emitted from the light-emitting element 30 is provided at a position substantially opposite to the main-signal optical grating 13. The main-signal light-beam transmitting section 22 includes a plurality of slits (not shown) that are arranged at a predetermined pitch with longitudinal direction thereof being substantially perpendicular to the measurement axis direction. A light beam emitted from the light-emitting element 30 passes through the plurality of slits onto the main-signal optical grating 13 of the main scale 10.

Additionally, on the index substrate 21, a movable origin light-beam transmitting section 23 is provided at a position substantially opposite to the origin optical grating 14 of the main scale 10. The origin light-beam transmitting section 23 includes an origin slit (not shown) of which longitudinal direction is substantially perpendicular to the measurement axis direction. A light beam emitted from the light-emitting element 30 passes through the origin slit onto the main scale 10.

The light-emitting element 30 and the receiver unit 40 are thus fixed on the index scale 20. Accordingly, as the index scale 20 is moved, the light-emitting element 30 and the receiver unit 40 are also moved relative to the main scale 10. The receiver unit 40 is disposed on a surface of the index scale 20 which opposes the main scale 10. The light-emitting element 30 is disposed on the side of the surface that opposes the main scale 10.

The light-emitting element 30 includes a main-signal light-emitting element 31 and an origin light-emitting element 32. The main-signal light-emitting element 31 and the origin light-emitting element 32 are connected to the index scale 20 by a frame (not shown).

The main-signal light-emitting element 31 includes, as a light source, a red LED (Light Emitting Diode) 31A that emits red light (having wavelength of 660 nm). The red LED 31A is electrically connected with a control circuit (not shown) and emits red light when predetermined power is supplied under the control of the control circuit. The red LED 31A is angled such that the red light emitted therefrom passes through the main-signal light-beam transmitting section 22 to be reflected by the reflective section 13A of the optical grating 13 of the main scale 10 and received by a below-described main-signal photo detector 41 of the receiver unit 40 of the index scale 20.

The origin light-emitting element 32 includes, as a light source, an infrared LED 32A that emits infrared light (having wavelength of 890 nm). The infrared LED 32A is electrically connected with a control circuit (not shown) and emits infrared light when predetermined power is supplied under the control of the control circuit. The infrared LED 32A is angled such that the infrared light emitted therefrom passes through the origin light-beam transmitting section 23 and reaches a position on an extension of the origin optical grating 14 on the main scale 10 which extends in the measurement direction to be reflected by the origin optical grating 14 and received by a below-described origin photo detector 42 of the receiver unit 40.

As shown in FIGS. 3A and 3B, the origin light-emitting element 32 includes an aperture 33 (a light-collimating member) that extends in a direction in which the infrared light is emitted from the infrared LED 32A. The aperture 33 is substantially cylindrical of which dimension of an inner diameter substantially coincides with a dimension of an infrared-light emitting surface 32B of the infrared LED 32A. Accordingly, an inner circumferential surface of the aperture 33 prevents scattering of the infrared light emitted from the infrared LED 32A, so that the infrared light is emitted from an end of the aperture as substantially collimated light.

The receiver unit 40 includes a main-signal photo detector 41 and the origin photo detector 42.

The main-signal photo detector 41 is electrically connected with a control circuit (not shown) and generates a predetermined displacement signal when receiving red light emitted from the main-signal light-emitting element 31, the generated displacement signal being input to the control circuit. At this time, the main-signal photo detector 41 generates no signal even when receiving the infrared light emitted from the infrared LED 32A of the origin light-emitting element 32. Specifically, the main-signal photo detector 41 includes a plurality of photo-detector arrays PDA (not shown). The photo-detector arrays PDA each include at least one set of four photo detectors arranged at a pitch of $3\lambda/4$ when the optical grating 13 of the main scale 10 have a pitch of $\lambda$. Owing to the photo-diode arrays PDA, four-phase (A, BB, AB and B) displacement signals shifted by 270 degrees can be obtained in accordance with the displacement of the main scale 10 (the relative displacement between the main scale 10 and the index scale 20).

The origin photo detector 42 is electrically connected with a control circuit (not shown) and generates a predetermined displacement signal when receiving the infrared light emitted from the origin light-emitting element 32, the generated displacement signal input to the control circuit. At this time, the origin photo-detector 42 generates no signal even when receiving the red light emitted from the red LED 31A. The origin photo detector 42 includes, for example, a single photo-detector array (not shown) to generate a predetermined origin signal when the origin photo detector 42 receives the infrared light emitted from the origin light-emitting element 32. Accordingly, the index scale 20 can be positioned at an origin by detecting that the index scale 20 has been moved to a predetermined position on the main scale 10 based on the displacement of the main scale 10 (the relative displacement between the main scale 10 and the index scale 20). Although the origin photo detector 42 receives the infrared light reflected by the origin optical grating and a signal is generated when the index scale 20 has been moved to the origin position in the first embodiment, ABS (Absolute) patterns may be provided on the main scale 10 and a predetermined signal may be generated based on a relative position from the origin.

In such an arrangement, when the main-signal light-emitting element 31 and the origin light-emitting element 32 of the light-emitting element 30 emit light under the control of the control circuits, the red light and the infrared light respectively emitted from the red LED 31A and the infrared LED 32A respectively pass through the main-signal light-beam transmitting section 22 and the origin light-beam transmitting section 23 of the index scale 20 to be irradiated onto the main scale 10. The entirety of or a part of the red light and the infrared light are respectively reflected by the main-signal optical grating 13 and the origin optical grating 14 of the main scale 10, so that the reflected red light enters the main-signal photo detector 41 of the index scale 20 while the reflected infrared light enters the origin photo detector 42 of the index scale 20.

At this time, when the main scale 10 and the index scale 20 are relatively moved along the measurement axis, light amounts of the red light and the infrared light reflected by the optical grating 12 change, so that the main-signal photo detector 41 and the origin photo detector 42 of the receiver unit 40 respectively generate a predetermined electrical signal in accordance with the light amount change to output the generated signals to the control circuits. Then, based on the input electrical signals, the control circuits calculate the relative movement amounts of the main scale 10 and the index scale 20 as well as the origin position of the index scale 20.

Effects and Advantages of First Embodiment

As described above, the optical encoder 100 of the first embodiment is provided with: the light-emitting element 30 including the main-signal light-emitting element 31 having the red LED 31A that emits red light, and the origin light-emitting element 32 having the infrared LED 32A that emits infrared light; and the receiver unit 40 including the main-signal photo detector 41 that receives the red light to generate a predetermined signal, and the origin photo detector 42 that receives the infrared light to generate a predetermined signal.

The main-signal photo detector 41 generates a predetermined signal in response only to the red light emitted from the main-signal light-emitting element 31 while the origin photo detector 42 generates a predetermined signal in response only to the infrared light emitted from the origin light-emitting element 32. Accordingly, even when the infrared light enters the main-signal photo detector 41 or the red light enters the origin photo detector 42, no signal is generated by the light, thereby effectively preventing crosstalk. As a result, the optical encoder 100 can have higher measurement accuracy. Since the crosstalk can thus be avoided, the main-signal photo detector 41 and the origin photo detector 42 can be located close to each other, thereby facilitating downsizing of the optical encoder 100.

The infrared LED 32A of the origin light-emitting element 32 is provided with the substantially cylindrical aperture 33 extending in the infrared-light emitting direction. Since the infrared light emitted from the infrared LED 32A is arranged to pass through the aperture 33, the inner circumferential surface of the aperture 33 can prevent scattering components spreading outward from a main optical axis of the infrared light, so that substantially collimated infrared light can be emitted from the end of the aperture 33.

Second Embodiment

An optical encoder 100A according to a second embodiment of the present invention will be described below with reference to the drawings.

Figure 5:
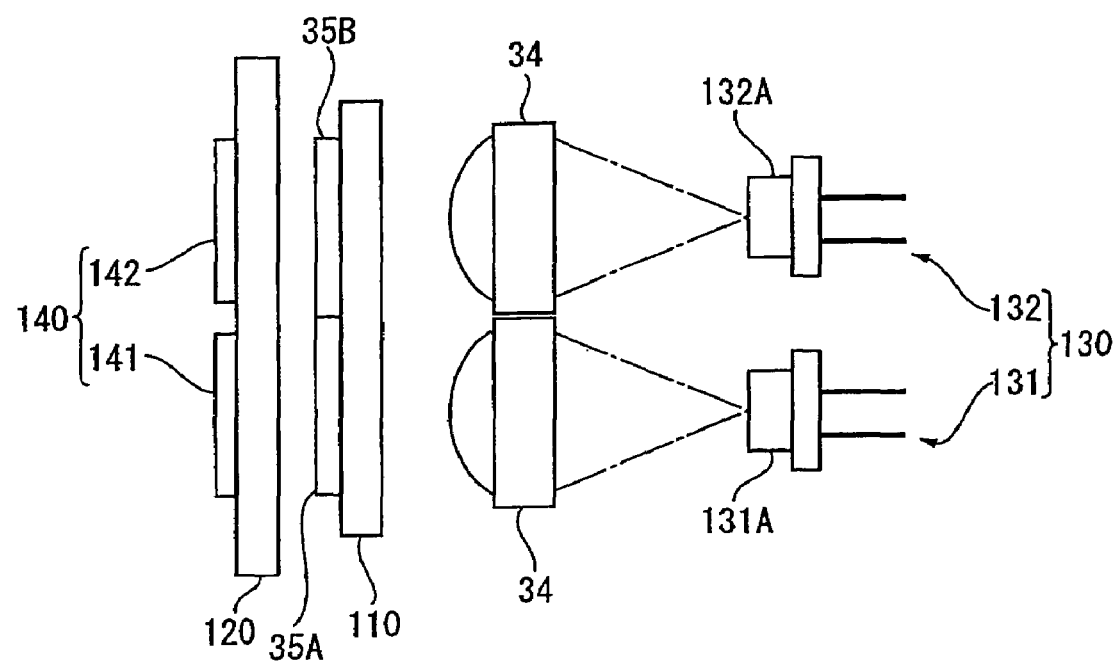
FIG. 5 is a side view of the optical encoder of the second embodiment.

FIG. 4 is a front view of the optical encoder of the second embodiment. FIG. 5 is a side view of the optical encoder of the second embodiment.

In the reflective optical encoder 100 in the first embodiment, the red light and the infrared light are reflected by the main scale 10 to be respectively received by the main-signal photo detector 41 and the origin photo detector 42. The transmissive optical encoder 100A of the second embodiment will be described below, in which light having a predetermined wavelength is transmitted through a main scale 110 to be received by a photo detector.

In FIG. 4, the optical encoder 100A includes the main scale 110, an index scale 120, a light-emitting element 130, a photo detector 140 and the like.

The main scale 110 has a transparent main scale substrate 111 formed in a strip shape and made of low linear-expansion-coefficient material (e.g. glass). On the main scale substrate 111, a main-signal optical grating 112 and an origin optical grating 113 are provided along a measurement axis extending in a longitudinal direction of the main scale substrate 111.

The main-signal optical grating 112 is disposed on one side in the measurement axis of the main scale substrate 111. The main-signal optical grating 112 includes main-signal light-transmitting sections 112A that transmit main-signal light and main-signal light shield sections 112B that shield the main-signal light which are arranged along the measurement axis at a predetermined pitch, forming a so-called INC (Incremental) pattern.

The origin optical grating 113 is disposed on the other end side extending along the measurement axis of the main scale substrate 111. The origin optical grating 113 includes origin light-transmitting sections 113A through which light for origin signal passes and origin light shield sections 113B that shield the light for origin signal, which are arranged along the measurement axis with random widths, forming so-called ABS (Absolute) patterns.

On a light-emitting side of the main scale 110 (i.e. on a surface opposing the index scale 120), a main-signal optical filter 35A and an origin optical filter 35B are provided, each transmitting light having a predetermined wavelength only.

The main-signal optical filter 35A is adhered on the main-signal optical grating 112. The main-signal optical filter 35A transmits red light emitted from a below-described main-signal light-emitting element 131 and shields light having a wavelength other than that of the red light.

On the other hand, the origin optical filter 35B is adhered on the origin optical grating 113. The origin optical filter 35B transmits infrared light emitted from a below-described origin light-emitting element 132 and shields light having a wavelength other than that of the infrared light.

The index scale 120 is made of low linear-expansion-coefficient material (e.g. glass) in a substantially plate shape having a surface opposing the main-signal optical grating 112 and the origin optical grating 113 of the main scale 110. As in the first embodiment, the index scale 120 is movable relative to the main scale 110 along the measurement axis of the main scale 110. The index scale 120 is provided with the photo detector 140.

The light-emitting element 130 is disposed on the opposite side of the index scale 120 relative to the main scale 110. The light-emitting element 130 is connected with the index scale 120 via a frame (not shown) and relatively movable with respect to the main scale 110 in accordance with movement of the index scale 120. As shown in FIGS. 4 and 5, the light-emitting element 130 includes the main-signal light-emitting element 131, the origin light-emitting element 132, condenser lenses 34 (light-collimating members) and the like. The main-signal light-emitting element 131 and the origin light-emitting element 132 are electrically connected with respective control circuits (not shown) and emit light under voltage control by the control circuits.

The main-signal light-emitting element 131 includes, as a light source, a red LED 131A that emits red light to the one side of the main scale 110 on which the main-signal optical grating 112 is provided.

On the other hand, the origin light-emitting element 132 includes, as a light source, an infrared LED 132A that emits infrared light to the other side of the main scale 110 on which the origin optical grating 113 is provided.

The condenser lenses 34 are respectively disposed between the red LED 131A and the main scale 110 and between the infrared LED 132A and the main scale 110 to bend light emitted from the red LED 131A and the infrared LED 132A and emit the collimated light toward the main scale 110.

The photo detector 140 is disposed on a side of the index scale 120 which does not oppose the main scale 110. The photo detector 140 includes a main-signal photo detector 141 that receives emitted light having passed through the main-signal optical grating 112 and an origin photo detector 142 that receives emitted light having passed though the origin optical grating 113. The main-signal photo detector 141 and the origin photo detector 142 are arranged along the measurement axis.

The main-signal photo detector 141 only receives red light formed by the INC patterns of the main-signal optical grating 112 to generate a predetermined electrical signal.

On the other hand, the origin photo detector 142 only receives infrared light formed by the ABS patterns of the origin optical grating 113 to generate a predetermined electrical signal. The main-signal photo detector 141 and the origin photo detector 142 are electrically connected with respective control circuits (not shown) to output the generated electrical signals to the control circuits.

In the above-described optical encoder 100A, the red light emitted from the red LED 131A of the main-signal light-emitting element 131 of the light-emitting element 130 and the infrared light emitted from the infrared LED 132A of the origin light-emitting element 132 of the light-emitting element 130 are collimated by the respective condenser lenses 34 to be emitted to the main scale 110.

The red light passes through the main-signal light-transmitting sections 112A of the main-signal optical grating 112 provided on the main scale 110 and enters the main-signal optical filter 35A. The main-signal optical filter 35A shields light having a wavelength other than that of red light to solely emit the red light to the main-signal photo detector 141 of the index scale 120.

On the other hand, the infrared light emitted from the infrared LED 132A passes through the origin light-transmitting sections 113A of the origin optical grating 113 provided on the main scale 110 and enters the origin optical filter 35B. The origin optical filter 35B shields light having a wavelength other than that of infrared light to solely emit the infrared light to the origin photo detector 142 of the index scale 120.

When the main-signal photo detector 141 receives the red light, a predetermined electrical signal is input to the control circuit in accordance with an amount of the received red light, whereby an absolute value of the relative movement between the main scale 110 and the index scale 120 is calculated. When the origin photo detector 142 receives the infrared light, a predetermined electrical signal is input to the control circuit in accordance with an amount of the received infrared light, whereby a movement amount of the index scale 120 from the origin is calculated.

Effects and Advantages of Second Embodiment

As in the first embodiment, the main-signal light-emitting element 131 emits red light and the origin light-emitting element 132 emits infrared light in the optical encoder of the second embodiment. The main-signal photo detector 141 only receives the red light and the origin photo detector 142 only receives the infrared light. Hence, even when, for example, the infrared light enters the main-signal photo detector 141, no electrical signal is generated by the incident infrared light and only the red light generates an electrical signal. Similarly, in the origin photo detector 142, an electrical signal is generated only by the infrared light. Accordingly, since the main-signal photo detector 141 and the origin photo detector 142 only receive light respectively emitted from the main-signal light-emitting element 131 and the origin light-emitting element 132 to generate a predetermined signal, crosstalk can be effectively prevented. As a result, the optical encoder 100A can have higher measurement accuracy. Further, since crosstalk can be avoided even when the main-signal photo detector 141 and the origin photo detector 142 are located close to each other, downsizing of the optical encoder 100A can be facilitated.

The main-signal optical filter 35A is provided on the INC pattern on the main scale 110 while the origin optical filter 35B is provided on the ABS pattern on the main scale 110. Accordingly, when light having a wavelength other than that of the red light is contained in the red light emitted from the main-signal light-emitting element 131, the light having the wavelength other than that of the red light can be cut by the main-signal optical filter 35A. Hence, even when the light emitted from the INC pattern of the main scale 110 enters on the origin photo detector 142, no defect signal is generated on the origin photo detector 142 since the main-signal optical filter 35A cuts the infrared light to be received by the origin photo detector 142. In the same manner, even when the light emitted from the ABS pattern of the main scale 110 enters on the main-signal photo detector 141, no defect signal is generated on the main-signal photo detector 141 since the origin optical filter 35B cuts the red light to be received by the main-signal photo detector 141. Hence, crosstalk on the photo detector 140 can be further reliably prevented, thereby further enhancing the accuracy of the optical encoder 100A.

In addition, the light-emitting element 130 includes the condenser lenses 34 respectively collimating the light emitted from the main-signal light-emitting element 131 and the origin light-emitting element 132. Hence, light emitted from the light-emitting elements can be prevented from scattering. Therefore, crosstalk can be effectively avoided, so that the optical encoder 100A can exhibit high accuracy in measurement.

Third Embodiment

An optical encoder according to a third embodiment of the present invention will be described below with reference to the drawings.

Figure 6:
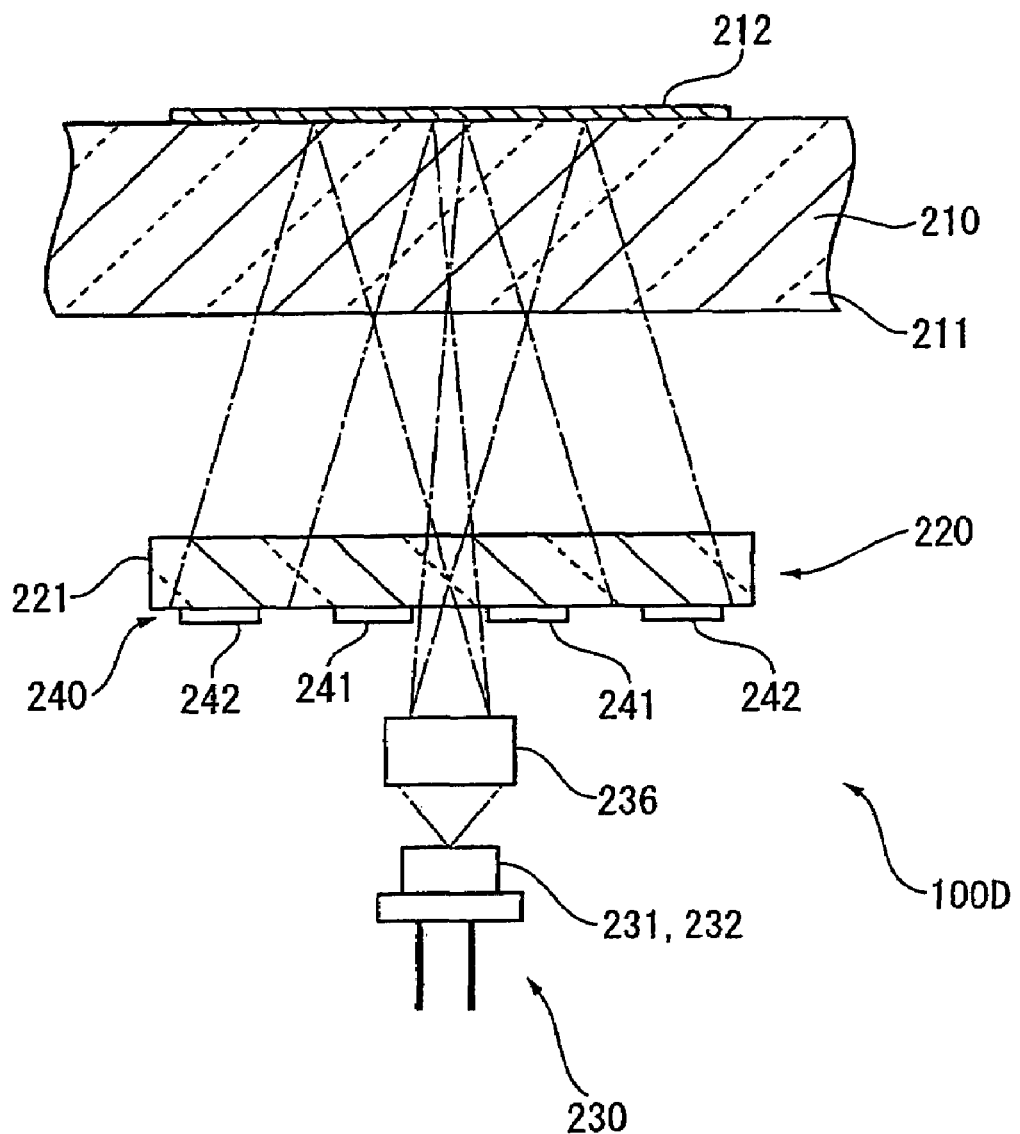
FIG. 6 is a side cross section of an optical encoder of a third embodiment of the invention.
Figure 7:
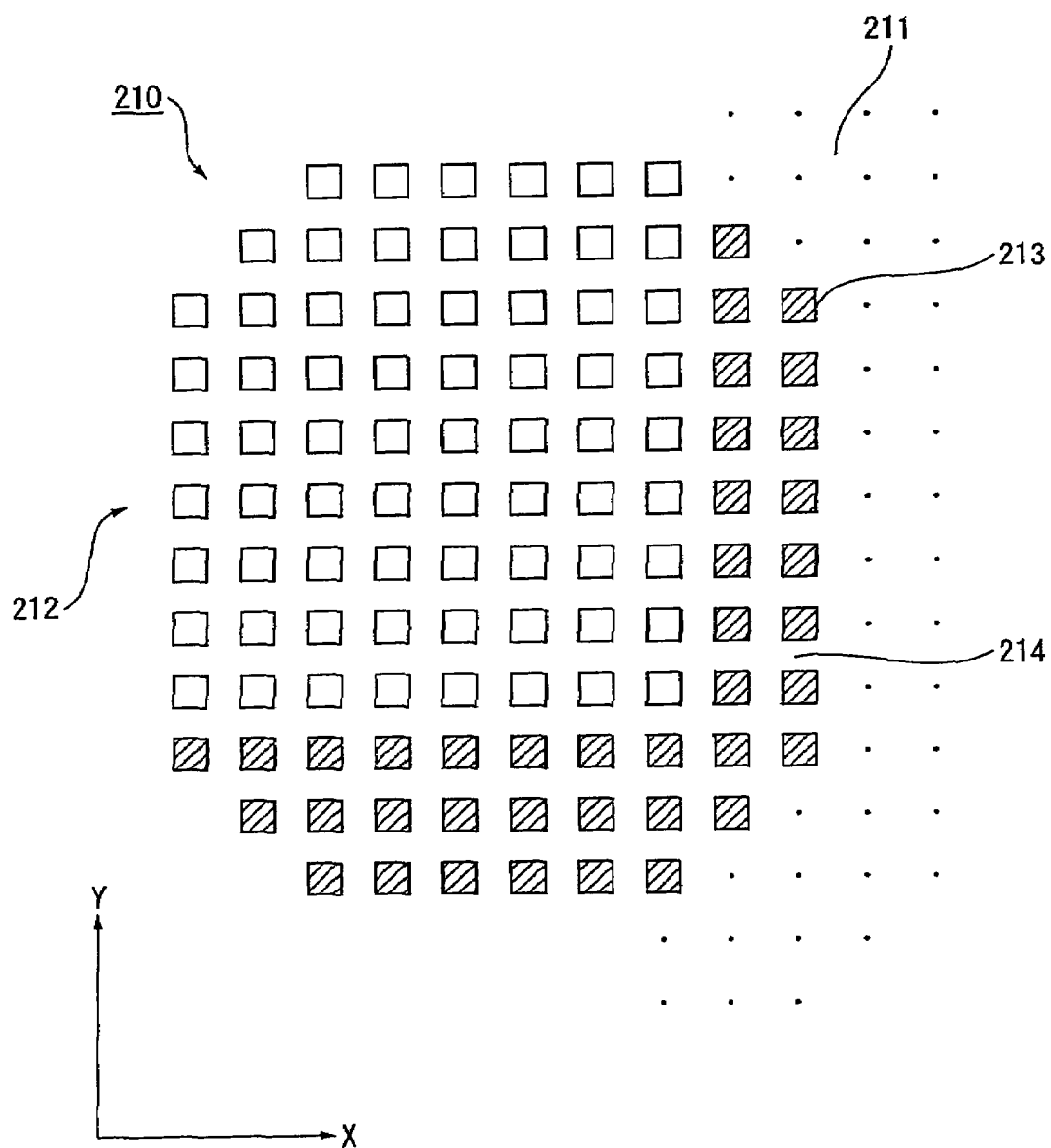
FIG. 7 is a plan view partially showing a main scale of the optical encoder of the third embodiment.
Figure 8:
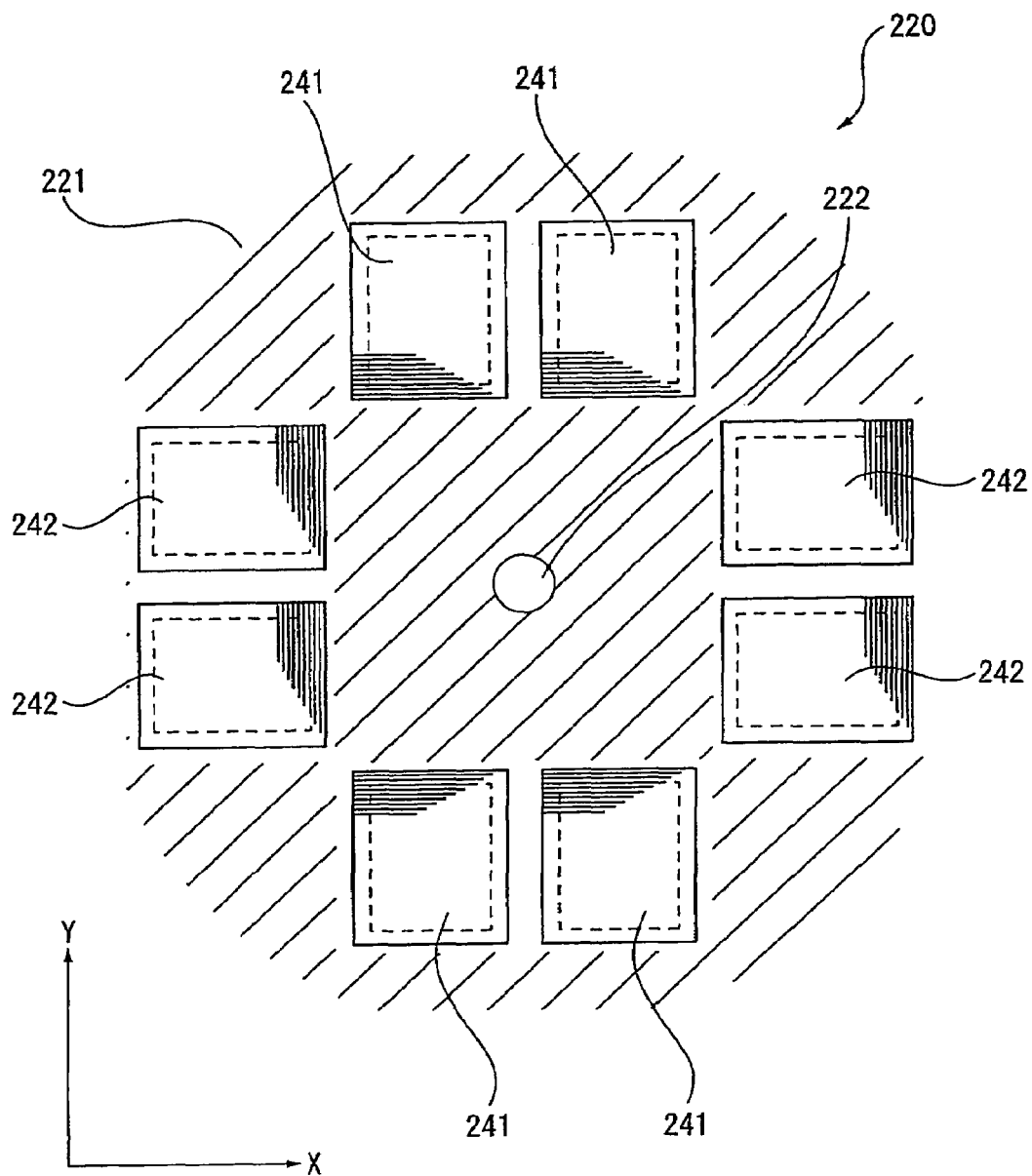
FIG. 8 is a plan view partially showing an index scale and a photo detector of the optical encoder of the third embodiment.

FIG. 6 is a side cross section of an optical encoder of the third embodiment. FIG. 7 is a plan view partially showing a main scale of the optical encoder of the third embodiment. FIG. 8 is a plan view partially showing an index scale and a photo detector of the optical encoder of the third embodiment.

In an optical encoder 100D of the third embodiment, a main scale 210 and an index scale 220 are relatively moved in two-dimensions.

In FIGS. 6 to 8, the optical encoder 100D includes the main scale 210, the index scale 220, a light-emitting element 230 provided on the index scale 220 and a photo detector 240 provided on the index scale 220.

The main scale 210 includes a main scale substrate 211 in a substantially plate shape which is made of low linear-expansion coefficient material (e.g. glass). As shown in FIG. 6, on the main scale substrate 211, an optical grating 212 is provided in which reflective cells 213 and transparent cells 214 are arranged in a matrix at a regular pitch.

The index scale 220 is made of low linear-expansion-coefficient material (e.g. glass) and includes a transparent index substrate 221 opposing the main scale 210 as shown in FIGS. 6 and 8. On a side of the index substrate 221 opposite to the main scale 210, the light-emitting element 230 is provided. In the index substrate 221, a light-transmitting aperture 222 is formed, through which light emitted from the light-emitting element 230 is transmitted to the main scale 210. On the index substrate 221, the photo detector 240 is provided, which receives light reflected by the optical grating 212 of the main scale 210.

The light-emitting element 230 includes a red light-emitting element 231 having a red LED emitting red light and an infrared light-emitting element 232 having an infrared LED emitting infrared light. On the optical path of the light irradiated from the light-emitting element 230, a gradient index lens 236 that condenses light emitted from the red light-emitting element 231 and the infrared light-emitting element 232 is provided.

The photo detector 240 opposes the main scale 210 and includes Y photo detectors 241 and X photo detectors 242 arranged along the vertical and horizontal directions of the reflective cells 213 of the optical grating 212 of the main scale 210. The Y photo detectors 241 can only receive red light out of light emitted from the light-emitting element 230, whereby a predetermined electrical signal generated in accordance with the reception of the red light is input to a control circuit (not shown). On the other hand, the X photo detectors 242 can only receive infrared light out of the light emitted from the light-emitting element 230, whereby a predetermined electrical signal generated in accordance with the reception of the red light is input to a control circuit (not shown). Based on the electrical signals input from the Y photo detector 241 and the X photo detector 242, the control circuits calculate a relative movement amount of the index scale 220 relative to the main scale 210 in the two dimensions.

Effects and Advantages of Third Embodiment

In the third embodiment, following advantages can be achieved as well as the effects and advantages of the first and second embodiments.

In the optical encoder 100D of the third embodiment, since the movement in Y direction of the index scale 220 is detected by the red light and the movement in X direction thereof is detected by the infrared light, no crosstalk occurs between the Y photo detector 241 and the X photo detector 242, so that the relative movement amount of the main scale 210 and the index scale 220 can be reliably measured. Hence, the relative movement amount in the two dimensions of the index scale 220 relative to the main scale 210 can be reliably measured.

Fourth Embodiment

An optical encoder according to a fourth embodiment of the present invention will be described below with reference to the drawings.

The optical encoder of the fourth embodiment is a modification of the optical encoder 100D of the third embodiment, where the common components are given the same reference numerals and description thereof will be simplified or omitted.

Figure 9A:
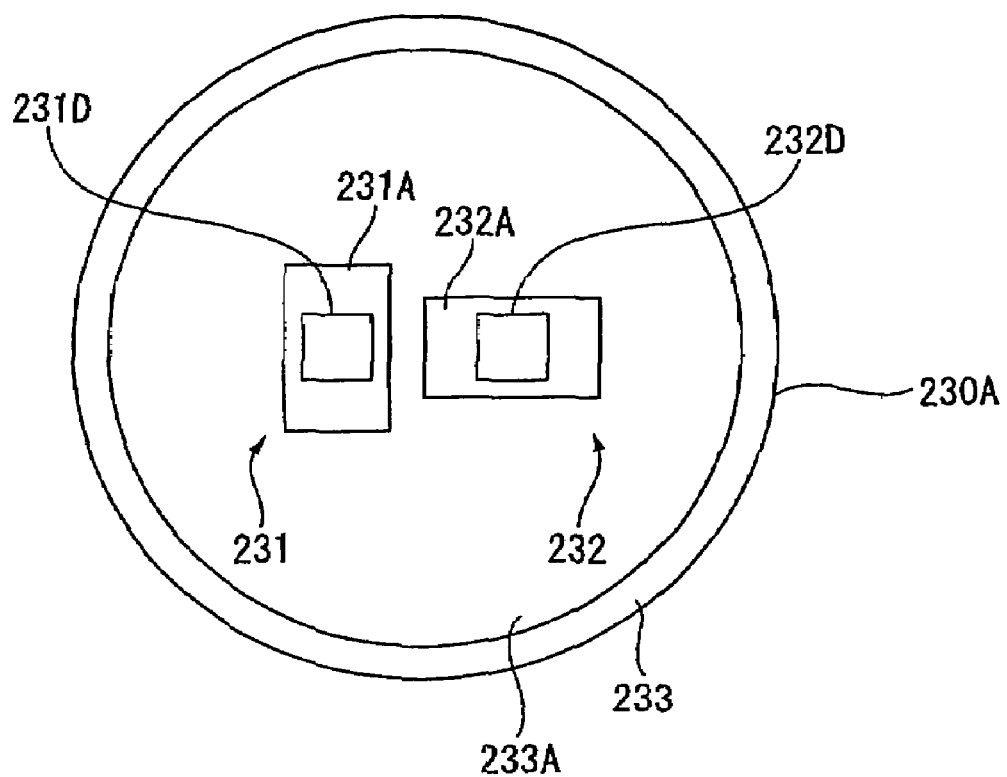
FIG. 9A is a front view partially showing a light-emitting element of the optical encoder of a fourth embodiment of the invention.
Figure 9B:
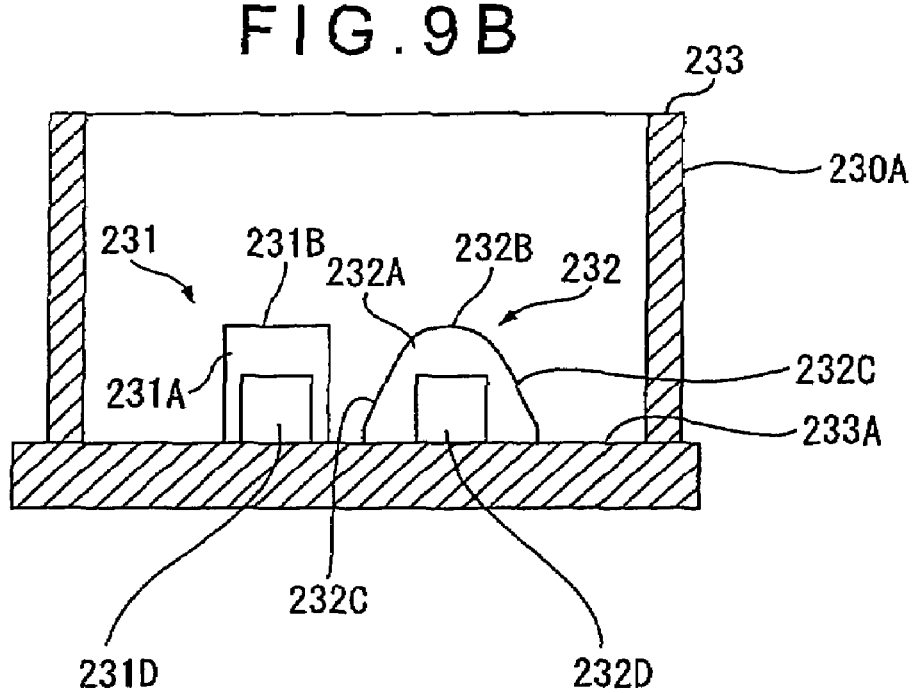
FIG. 9B is a cross section of the light-emitting element of the optical encoder of the fourth embodiment of the invention.
Figure 10:
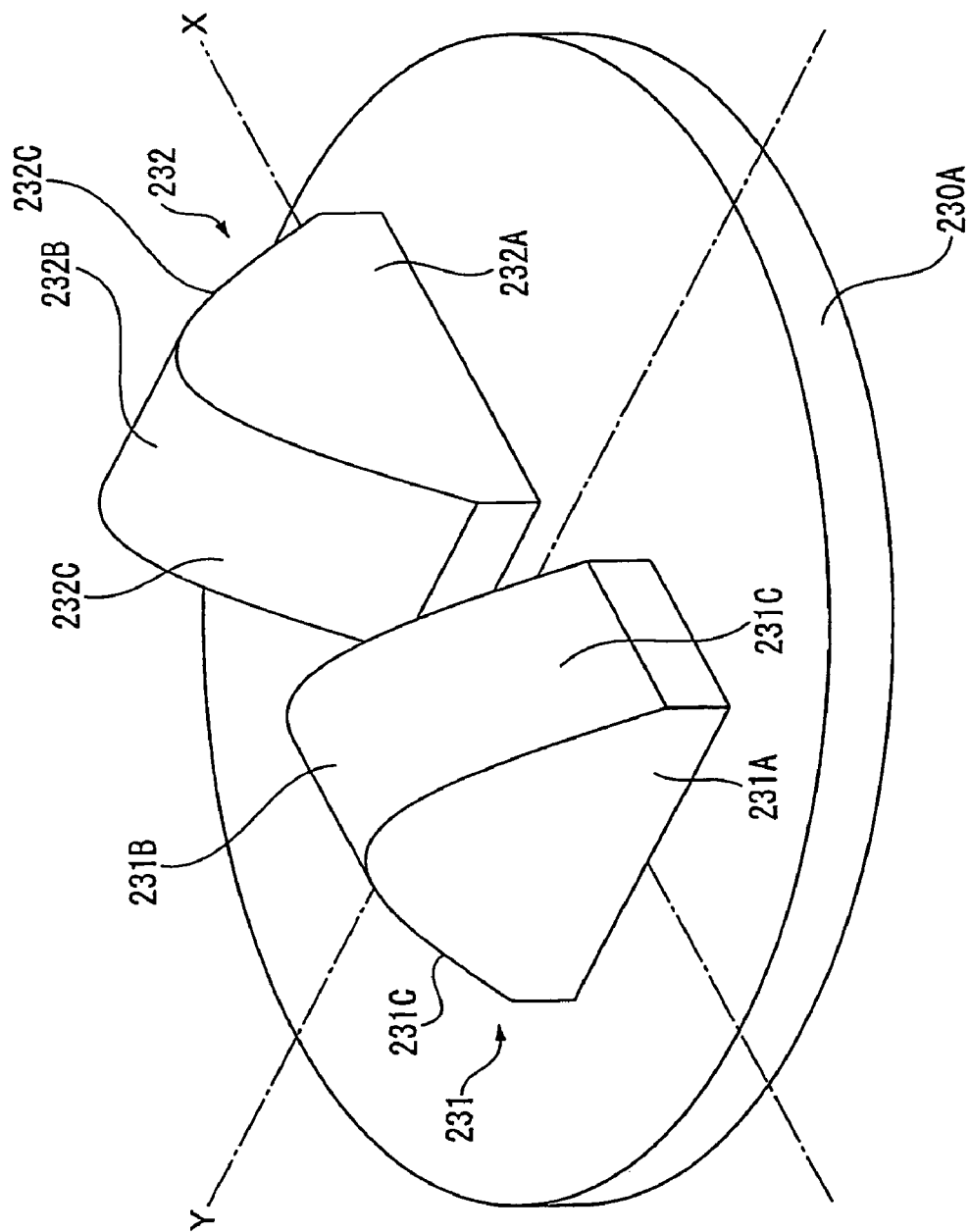
FIG. 10 is a perspective view partially showing the light-emitting element of the fourth embodiment.
Figure 11:
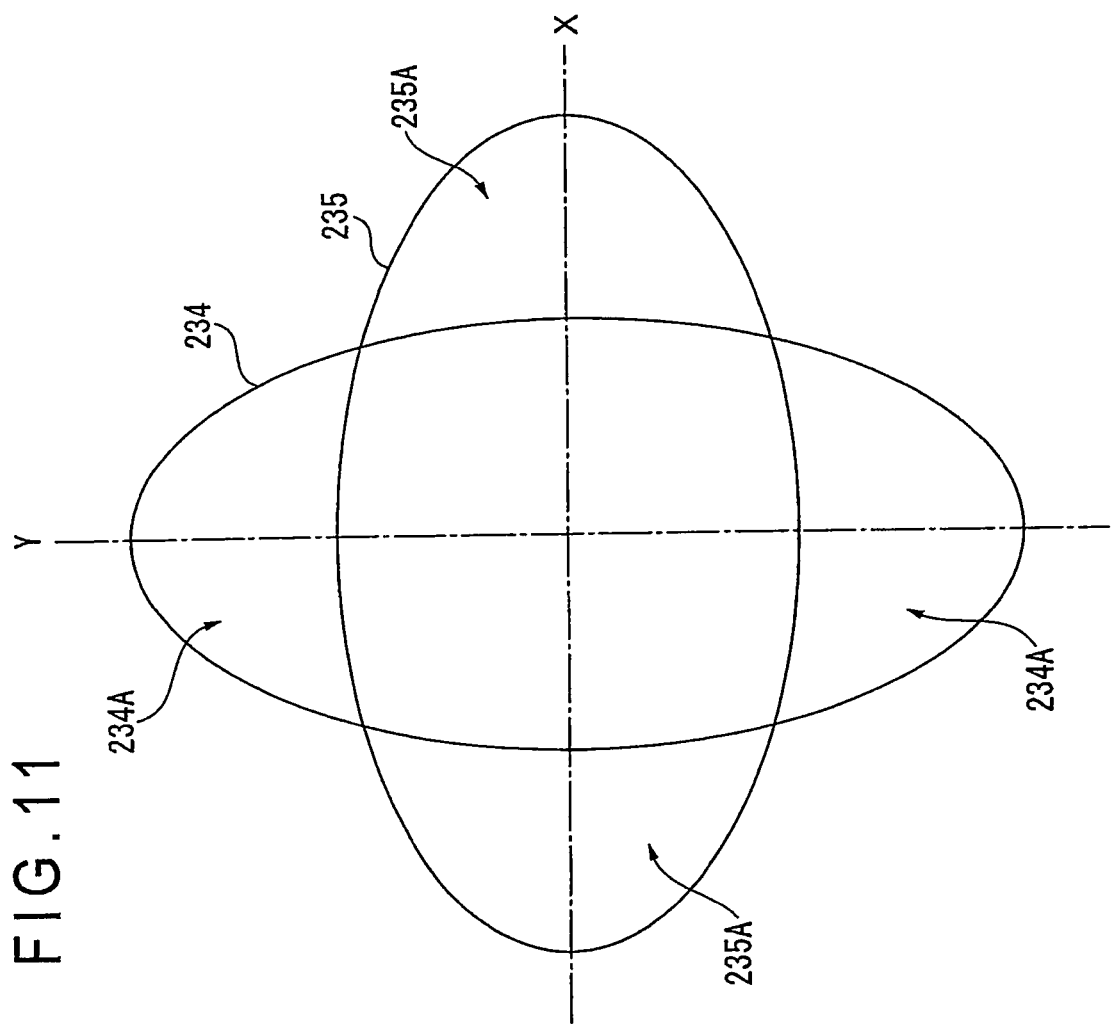
FIG. 11 is an illustration showing illumination distribution of light emitted from the light-emitting element of the fourth embodiment.

The optical encoder 100D in the fourth embodiment is an improvement of that of the third embodiment in terms of the light-emitting element 230. Specifically, although the gradient index lens 236 is employed in the optical encoder 100D of the third embodiment to condense a light beam emitted from the light-emitting element 230 and the condensed light is emitted to the main scale 210, a light-emitting element 230A is alternatively used in the fourth embodiment as shown in FIGS. 9A to 11. FIG. 9A is a plan view of the light-emitting element of the optical encoder of the fourth embodiment. FIG. 9B is a cross section of the light-emitting element of the optical encoder of the fourth embodiment FIG. 10 is a perspective view partially showing the light-emitting element of the third embodiment. FIG. 11 is an illustration showing illumination distribution of light emitted from the light-emitting element of the third embodiment.

The light-emitting element 230A is disposed in the light-transmitting aperture 222 of the index scale 220 to emit red light and infrared light to the main scale 210.

Specifically, as shown in FIGS. 9A, 9B and 10, the light-emitting element 230A includes a substantially cylindrical aperture 233. A bottom portion 233A is provided on one end of the aperture 233. On the bottom portion 233A, the red light-emitting element 231 and the infrared light-emitting element 232 are provided. The red light-emitting element 231 and the infrared light-emitting element 232 are electrically connected with the respective control circuits to be supplied with predetermined power under the control of the control circuits, whereby the red and infrared light-emitting elements 231, 232 respectively emit red light and infrared light. The light emitted from the red light-emitting element 231 and the infrared light-emitting element 232 is prevented from scattering outward by the inner circumferential surface of the aperture 233 and emitted from the end of the aperture 233 in a predetermined direction.

The red light-emitting element 231 and the infrared light-emitting element 232 respectively include illumination guiding lenses 231A and 232A made of, for example, transparent resin.

The illumination guiding lens 231A has an elongated bottom surface that extends substantially in parallel to the bottom portion 233A and abuts on the bottom portion 233A. Substantially at the center in the longitudinal direction of the illumination guiding lens 231A, a lens top 231B projecting toward the end of the aperture 233 is provided. Slant surfaces 231C extend from the longitudinal ends of the elongated bottom surface to the lens top 231B, forming substantially triangular shapes. Side surfaces enclosed by sides substantially in parallel to longitudinal sides of the elongated bottom surface, the slant surfaces 231C and the lens top 231B are vertically disposed. Further, substantially at the center of the elongated bottom portion, an LED mounting portion is provided, on which a red LED 231D emitting red light is disposed so as to be substantially perpendicular to the elongated bottom surface. The light emitted from the red LED 231D is magnified by the illumination guiding lens 231A to be emitted as an illumination distribution region 234 of a substantially ellipse shape as shown in FIG. 11.

Similarly to the illumination guiding lens 231A, the illumination guiding lens 232A has an elongated bottom surface that is substantially in parallel to and abuts on the bottom potion 233A. Substantially at the center in the longitudinal direction of the illumination guiding lens 232A, a lens top 232B projecting toward the end of the aperture 233 is provided. Slant surfaces 232C extending to the lens top 231B from respective ends in the longitudinal ends of the elongated bottom surface, forming a substantially triangular shape. Side surfaces enclosed by sides substantially in parallel to the sides extending in the longitudinal direction of the elongated bottom surface, the slant surfaces 232C and the lens top 232B are vertically disposed. Further, substantially at the center of the elongated bottom portion, an LED mounting portion is provided, on which an infrared LED 232D emitting infrared light is disposed. The light emitted from the infrared LED 232D is expanded by the illumination guiding lens 232A to be emitted in an illumination distribution region 235 of a substantially ellipse shape as shown in FIG. 11.

The illumination guiding lenses 231A, 232A are arranged on the bottom portion 233A with the longitudinal directions of the elongated bottom portions thereof being substantially perpendicular to each other. With this arrangement, the major axes (or the minor diameters) of the ellipses of the red-light illumination distribution region 234 and the infrared-light illumination distribution region 235 become substantially perpendicular to each other. By providing the light-emitting element 230A in the light-transmitting aperture 222 as shown in FIG. 8, the infrared light can be emitted in X direction and the red light can be emitted in Y direction.

Additionally, the Y photo detector 241 is located at a position displaced from the light-transmitting aperture 222 by a predetermined dimension while the X photo detector 242 is located at a position displaced from the light-transmitting aperture 222 by a predetermined dimension. Specifically, the Y photo detector 241 is positioned on an optical path along which the red light emitted onto a position 234A and reflected by the main scale 210 advances, the position 234A located in the illumination distribution region 234 and outside the illumination distribution region 235 (FIG. 11). On the other hand, the X photo detector 242 is positioned on an optical path on which the infrared light emitted at a position 235A that is located in the illumination distribution region 235 but outside of the illumination distribution region 234 and reflected by the main scale 210 advances.

Effects and Advantages of Fourth Embodiment

With the light-emitting element 230A of the optical encoder 100D of the fourth embodiment, following advantages can be achieved as well as the effects and advantages of the first to third embodiments.

In the optical encoder 100D of the fourth embodiment, the red light-emitting element 231 and the infrared light-emitting element 232 are provided in the single substantially cylindrical aperture 233.

Accordingly, work for attaching each of a plurality of light-emitting elements on the index scale 220 is not required. Hence, the arrangement can be simple and the attachment of the light-emitting element 230 on the index scale 220 can be facilitated.

The substantially triangular illumination guiding lenses 231A, 232A are disposed with the longitudinal directions of the elongated bottom surfaces thereof being substantially perpendicular to each other. Accordingly, the red light from the red light-emitting element 231 can be emitted on the illumination distribution region 234 having the substantially ellipsoidal shape which is elongated in Y direction while the infrared light from the infrared light-emitting element 232 can be emitted in the illumination distribution region 235 which is elongated in X direction.

In addition, the Y photo detector 241 is positioned on the optical path along which the red light emitted from the light-emitting element 230A to the position 234A and reflected by the main scale 210 advances, the position 234A located in the illumination distribution region 234 and outside of the illumination distribution region 235. The X photo detector 242 is positioned on the optical path along which the infrared light emitted at the position 235A and reflected by the main scale 210 advances, the position 235A located in the illumination distribution region 235 and outside of the illumination distribution region 234.

Hence, the Y photo detector 241 can reliably receive only the red light out of the light emitted from the light-emitting element 230A while the X photo detector 242 can reliably receive only the infrared light out of the light emitted from the light-emitting element 230A.

[Modifications]

It should be noted that the invention is not limited to the arrangements of the above-described embodiments but also includes following modifications.

For example, in the second embodiment, the optical filters 35A, 35B are adhered on the surface of the main scale 110 opposing to the index scale 120. However, the optical filters 35A, 35B may be adhered on the surface of the main scale 110 opposing the light-emitting element 130 or may be arranged on the index scale 120 as shown in FIG. 12.

Figure 12:
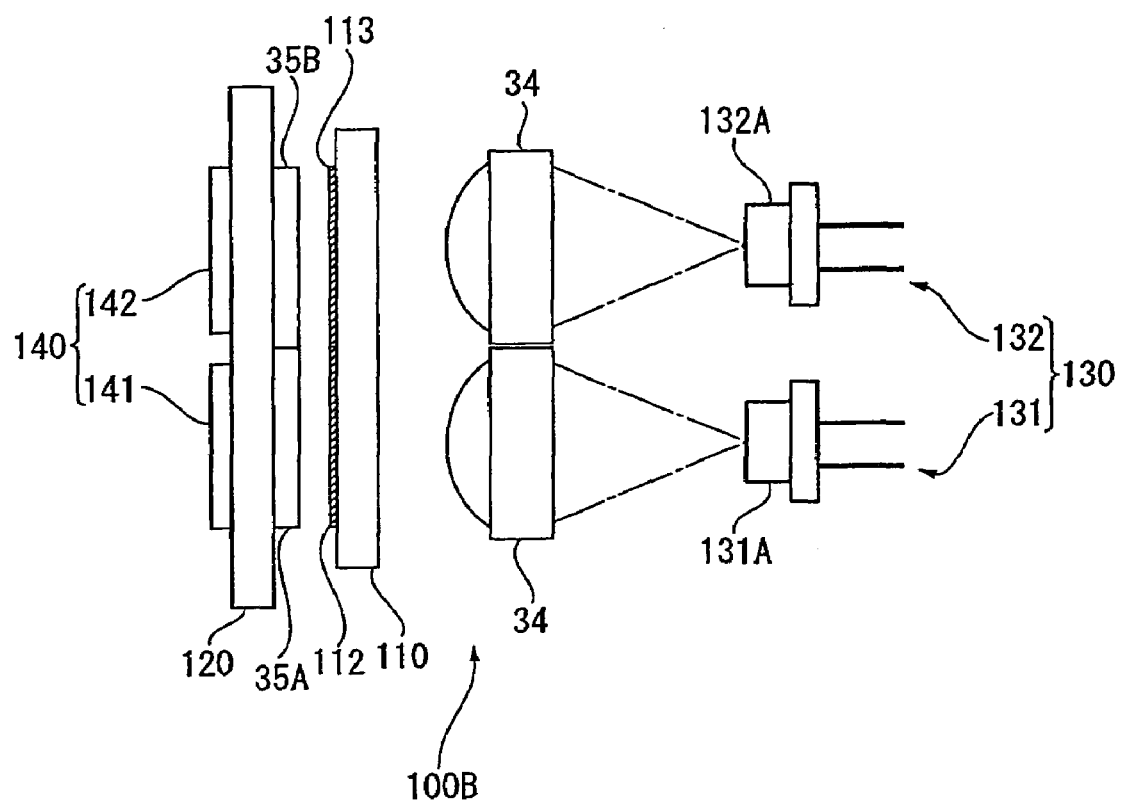
FIG. 12 is a side view of an optical encoder of another embodiment of the invention.

Specifically, in FIG. 12, a transmissive optical encoder 100B, which is similar to that of the second embodiment, includes the main scale 110, the index scale 120, the light-emitting element 130 and the photo detector 140. In the optical encoder 100B, the main-signal optical filter 35A and the origin optical filter 35B are adhered on a surface of the index scale 120 opposing the main scale 110. In other words, the main-signal optical filter 35A is adhered on a surface of the index scale 120 which opposes the main-signal optical grating 112 on the opposite side of the main-signal photo detector 141. The origin optical filter 35B is adhered on a surface of the index scale 120 which opposes the origin optical grating 113 on the opposite side of the origin photo detector 142.

With this arrangement, the distances respectively between the optical filters 35A, 35B and the photo detectors 141, 142 become short, so that light having a wavelength other than that of light to be received by the photo detectors 141, 142 can be prevented from entering the photo detectors 141, 142. Accordingly, crosstalk on the photo detectors 141, 142 can be effectively avoided, thereby enhancing the accuracy of the optical encoder 100B.

The aperture 33 exemplified in the first embodiment may also be provided to the optical encoder 100B of the second embodiment. In addition, the condenser lens 34 shown in the second embodiment may be also used in the first embodiment.

Although the arrangement where the aperture 33 is attached on the infrared LED 32A of the origin light-emitting element 32 is shown in the description of the first embodiment, the aperture 33 may be attached on the red LED 31A of the main-signal light-emitting element 31. Alternatively, the aperture 33 may be formed on both of the red LED 31A and the infrared LED 32A.

The light-collimating member is not limited to the above-mentioned aperture 33 or the condenser lens 34. Alternatively, a concave light collimating mirror or any other arrangement may be used to reflect and collimate light.

Although LEDs such as the red LED 31A and the infrared LED 32A are exemplified above as the light source, a semiconductor laser may be employed in place of the LEDs to emit a laser beam. In such an arrangement, since the laser beam emitted from the semiconductor laser includes no component having a wavelength other than a predetermined wavelength, only the laser beam emitted from a predetermined light-emitting element can be reliably received even when no light-collimating member or no filter is provided, as long as the photo detectors are adapted to receive light having a to-be-received wavelength only.

In the above description, the main-signal photo detectors 41, 141 and the Y photo detector 241 receive the red light while the origin photo detectors 42, 142 and the X photo detector 242 receive the infrared light. However, the arrangement is not limited thereto, but the photo detectors may receive light having a different wavelength. For instance, the main-signal light-emitting element 31, 131 may emit blue light to be received by the main-signal photo detector 41, 141, or the origin light-emitting element 32, 132 may emit red light to be received by the origin photo detector 42, 142.

In the first and second embodiments, the red LEDs 31A, 131A emit red light and the infrared LEDs 32A, 132A emit infrared light. However, as in the fourth embodiment, light having two wavelengths may be emitted from a single light source.

Further, although the arrangement where the photo detectors receive the respective light having the two wavelengths is exemplified, three or more photo detectors may be provided to receive respective light having three or more wavelengths.

Other details such as specific structures and procedures to implement the invention may be suitably changed within a range where an object of the invention can be achieved.

ADVANTAGES OF THE INVENTION

An optical encoder according to the invention can effectively prevent crosstalk to attain enhanced detection accuracy and to allow photo detectors to be located at positions closer to each other, thereby promoting downsizing of a device.

The priority application Number JP 2006-309183 upon which this patent application is based is hereby incorporated by reference.

What is claimed is:

1. An optical encoder, comprising:
a main scale on which at least two displacement-measuring optical gratings are arranged in a predetermined direction;
a single detector head movable in the predetermined direction relative to the main scale;
at least two light-emitting elements that emit light respectively to the optical gratings provided on the main scale; and
at least two photo detectors respectively provided for the optical gratings on the detector head, the photo detectors receiving the light transmitted through or reflected by the optical gratings, wherein the light-emitting elements emit light having a different wavelength to the respective optical gratings provided on the main scale, the photo detectors receive the light having a predetermined wavelength that has been transmitted through or reflected by the respective optical gratings, a filter is provided on an optical path of the light from the light-emitting elements to the photo detectors on at least one of a light-incident surface or a light-emitting surface of the optical gratings, the filter transmitting light that is emitted from the light-emitting elements and is provided with a predetermined wavelength while shielding light having a wavelength other than the predetermined wavelength, the at least two optical gratings being provided in parallel on the main scale adjacently with each other, and the at least two light-emitting elements and the at least two photo detectors being provided on the single detector head adjacently with each other corresponding to the optical gratings.

2. The optical encoder according to claim 1, wherein the light-emitting elements each include a light source for emitting the light and a light-collimating member for collimating the light emitted from the light source.

3. The optical encoder according to claim 2, wherein the light-collimating member is continuously provided around a circumference on a light-emitting surface of the light source, the light-collimating member having a substantially cylindrical shape with an axial direction thereof extending in a direction in which the light is emitted.

* * * * *